US012770165B2

(12) United States Patent
Nandi et al.

(10) Patent No.: US 12,770,165 B2
(45) Date of Patent: Oct. 20, 2026

(54) SYSTEM AND METHOD FOR PREDICTING ADVERTISING RELATED DATA BASED ON METADATA AND DIMENSIONALITY REDUCTION

(71) Applicant: Walmart Apollo, LLC, Bentonville, AR (US)

(72) Inventors: Koustav Nandi, Bangalore (IN); Nitish Varshney, Karnataka (IN); Girish Sathyanarayana, Mysore (IN); Kunal Kishore, Jharkhand (IN)

(73) Assignee: Walmart Apollo, LLC, Bentonville, AR (US)

( * ) Notice: Subject to any disclaimer, the term of this patent is extended or adjusted under 35 U.S.C. 154(b) by 7 days.

(21) Appl. No.: 18/505,326

(22) Filed: Nov. 9, 2023

(65) Prior Publication Data

US 2025/0156896 A1 May 15, 2025

(51) Int. Cl.
*G06Q 30/02* (2023.01)
*G06N 3/091* (2023.01)
(Continued)

(52) U.S. Cl.
CPC ......... *G06Q 30/0243* (2013.01); *G06N 3/091* (2023.01); *G06Q 30/0277* (2013.01)

(58) Field of Classification Search
CPC ............... G06Q 30/02; G06Q 30/0243; G06Q 30/0277; G06Q 30/0254; G06Q 10/067;
(Continued)

(56) References Cited

U.S. PATENT DOCUMENTS 9,361,322 B1 * 6/2016 Dutta .................... G06F 16/435
10,936,947 B1 3/2021 Flunkert et al.
(Continued)

FOREIGN PATENT DOCUMENTS

CN 110580253 5/2022
IN 202211018390 A 4/2022
(Continued)

OTHER PUBLICATIONS

Tavakoli, Neda; Siami-Namini, sima; Khanghah, Mahdi Adi; Soitani, Fihimeh Mirza; Namin, Akbar Siami, Clustering Time Series Data through Autoencoder-based Deep Learning Models (English), Apr. 11, 2020 (Year: 2020).*
(Continued)

*Primary Examiner* — Marilyn G Macasiano
(74) *Attorney, Agent, or Firm* — Morgan, Lewis & Bockius LLP; Manita Rawat

(57) ABSTRACT

Systems and methods for predicting advertising related inventory and opportunity for advertising campaigns based on metadata and dimensionality reduction are disclosed. In some embodiments, a disclosed method includes: receiving, from a computing device, a prediction request associated with an advertising campaign; determining a metadata set associated with the advertising campaign; generating, based on a machine learning model, an embedding for the metadata set; determining, based on the embedding, at least one embedding associated with at least one advertising opportunity data; generating predicted advertising opportunity data for the advertising campaign based on the at least one advertising opportunity data; and transmitting the predicted advertising opportunity data to the computing device.

20 Claims, 8 Drawing Sheets

800

(51) Int. Cl.
*G06Q 30/0241* (2023.01)
*G06Q 30/0242* (2023.01)

(58) Field of Classification Search
CPC . G06Q 30/0246; G06Q 30/0207; G06N 3/091
See application file for complete search history.

(56) References Cited

U.S. PATENT DOCUMENTS

| | | | | |
|---|---|---|---|---|
| 2010/0082401 | A1* | 4/2010 | Vee | G06Q 30/0202 705/7.31 |
| 2015/0271540 | A1* | 9/2015 | Melby | H04N 21/25891 725/34 |
| 2015/0287104 | A1* | 10/2015 | Gupta | G06Q 30/0241 705/14.71 |
| 2019/0042956 | A1 | 2/2019 | Huang et al. | |
| 2022/0067181 | A1* | 3/2022 | Carley | G06F 18/217 |
| 2023/0017966 | A1 | 1/2023 | Skoff et al. | |
| 2023/0052691 | A1 | 2/2023 | Thiruvenkatanathan | |
| 2023/0078712 | A1* | 3/2023 | Shoamanesh | G06Q 50/01 705/14.43 |

FOREIGN PATENT DOCUMENTS

| | | | | |
|---|---|---|---|---|
| JP | 2023-500511 A * | 1/2023 | | G06N 20/00 |
| WO | WO 2022/051237 A1 * | 3/2022 | | G06F 21/60 |

OTHER PUBLICATIONS

I. Cui et al., “Build a cold start time series forecasting engine using AutoGluon,” AWS Machine Learning Blog, Mar. 4, 2022, 7 pages.
J. Bernard et al., “Guided discovery of interesting relationships between time series clusters and metadata properties,” i-KNOW ’12: Proceedings of the 12th International Conference Knowledge Management and Knowledge Technologies, Article No. 22, Sep. 2012, 13 pages.
C. Cassisi et al., Similarity Measures and Dimensionality Reduction Techniques for Time Series Data Mining, Intech Open, (Year: 2012), 28 pages.
Yu, Chekyun, et al.; “A fast LSH-based similarity search method for multivariate time series”; Oct. 19, 2018; Science Direct, Information Sciences 475 pp. 337-356.
AgglomerativeClustering—scikit-learn 1.7.2 documentation; © Copyright 2007-2025, scikit-learn developers (BSD License); https://scikit-learn.org/stable/modules/generated/sklearn.cluster.AgglomerativeClustering.html.
Williams, Brian, “Contrasive Loss Explained” Mar. 3, 2020; https://towardsdatascience.com/contrastive-loss-explaned-159f2d4a87ec.
Triplet Loss—Wikipedia the Free Encyclopedia; https://en.wikipedia.org/wiki/Triplet_loss.
Zhao, Mengliu, “A Practical Guide to Contrastive Learning”, Jul. 30, 2024; https://towardsdatascience.com/a-practical-guide-to-contrastive-learning-26e912c0362f.

* cited by examiner

500

800

SYSTEM AND METHOD FOR PREDICTING ADVERTISING RELATED DATA BASED ON METADATA AND DIMENSIONALITY REDUCTION

TECHNICAL FIELD

This application relates generally to advertising campaigns and, more particularly, to systems and methods for predicting advertising related inventory and opportunity for advertising campaigns based on metadata and dimensionality reduction.

BACKGROUND

An advertisement may be a presentation or communication to promote an item, such as a product or service, for purchase. At least some advertisements are digital advertisements, which include a digital representation of the presentation or communication, such as one displayed on a website. A sponsor of an advertisement, such as a business, may seek to sell the item in the advertisement. The sponsor may advertise the item in the advertisement to notify potential buyers of the sale of the item, thereby increasing the chances of selling the item. For example, the sponsor may advertise the item on a website, such as a retailer's website.

In some examples, the advertisement may be part of an advertising campaign that identifies one or more products to promote on the website. Each advertising campaign may be established to reach a target audience determined based on several factors such as demographics, interests, and shopping behavior etc. It is valuable to predict an amount of advertising opportunity for a given campaign in a future time period. Existing prediction models face significant challenges in accurate long-term forecasting for new and cold advertising opportunity data, which are characterized by a lack of historical data, new audience provided by advertiser or sudden changes in consumer behavior. This can lead to inaccurate forecasts and inefficient advertising campaigns. Various methods proposed to address this challenge are based on temporal data and require at least a few days of historical advertising opportunity data, which limits their effectiveness.

SUMMARY

The embodiments described herein are directed to systems and methods for predicting advertising related inventory and opportunity for advertising campaigns based on metadata and dimensionality reduction.

In various embodiments, a system including a non-transitory memory configured to store instructions thereon and at least one processor is disclosed. The at least one processor is configured to read the instructions to: receive, from a computing device, a prediction request associated with an advertising campaign; determine a metadata set associated with the advertising campaign; generate, based on a machine learning model, an embedding for the metadata set; determine, based on the embedding, at least one embedding associated with at least one advertising opportunity data; generate predicted advertising opportunity data for the advertising campaign based on the at least one advertising opportunity data; and transmit the predicted advertising opportunity data to the computing device.

In various embodiments, a computer-implemented method is disclosed. The computer-implemented method includes: receiving, from a computing device, a prediction request associated with an advertising campaign; determining a metadata set associated with the advertising campaign; generating, based on a machine learning model, an embedding for the metadata set; determining, based on the embedding, at least one embedding associated with at least one advertising opportunity data; generating predicted advertising opportunity data for the advertising campaign based on the at least one advertising opportunity data; and transmitting the predicted advertising opportunity data to the computing device.

In various embodiments, a non-transitory computer readable medium having instructions stored thereon is disclosed. The instructions, when executed by at least one processor, cause at least one device to perform operations including: receiving, from a computing device, a prediction request associated with an advertising campaign; determining a metadata set associated with the advertising campaign; generating, based on a machine learning model, an embedding for the metadata set; determining, based on the embedding, at least one embedding associated with at least one advertising opportunity data; generating predicted advertising opportunity data for the advertising campaign based on the at least one advertising opportunity data; and transmitting the predicted advertising opportunity data to the computing device.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
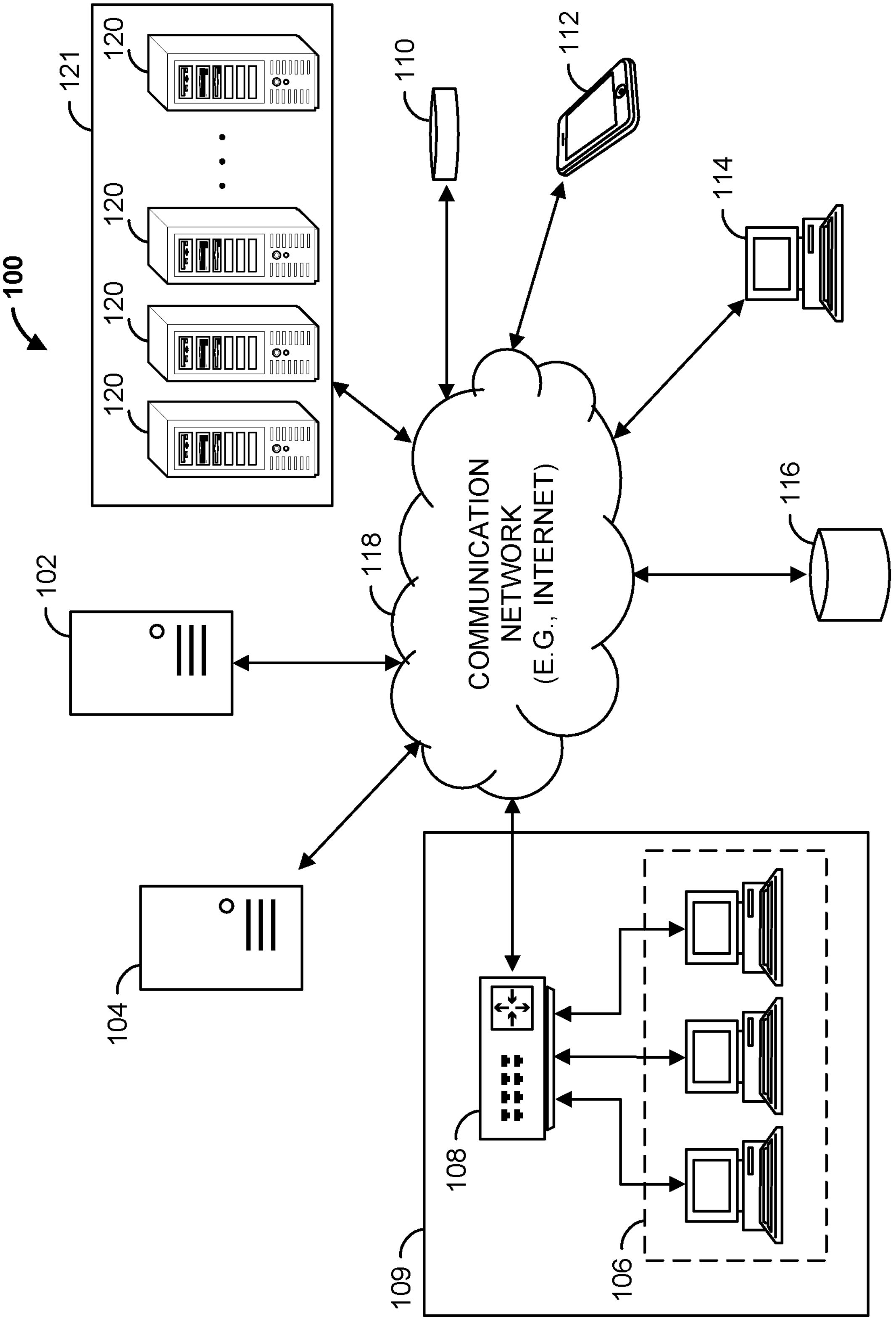
FIG. 1 is a network environment configured to predict advertising opportunity for advertising campaigns, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

An online marketplace or retailer may provide advertising opportunities to online sellers who want to promote their products, e.g. when a user submits a query, clicks on an item, or adds an item to cart online. Since the amount of advertising opportunities for a given advertising campaign would change with time, a time series data can be used to represent the advertising opportunities for each advertising campaign. While the retailer can provide an advertising platform allowing advertisers to manage their campaigns directly on the retailer's website, forecasting future advertising opportunities plays a key role as it helps advertisers to plan and allocate their budgets more effectively based on the forecasted time series of advertising opportunities.

One goal of the present teaching is to forecast advertising opportunities for cold and new time-series lacking historical data or having stale data. In some embodiments, a disclosed system utilizes metadata of the cold and new time-series to predict future advertising opportunities. The system can find similar one or more time-series and generate predicted advertising opportunities for new and cold time-series data based on the metadata, without requiring temporal data or any amount of historical data. The disclosed prediction method can significantly enhance the effectiveness of advertising campaigns by providing more accurate forecast for cold time-series.

In some embodiments, a disclosed system can cluster a plurality of time-series data each representing predicted advertising opportunity for a respective targeting criteria set associated with an advertising campaign. The targeting criteria set includes criteria identifying a specific set of users defined in contextual terms or behavioral terms or keyword terms. The plurality of time-series data may be clustered based on a similarity measure and a clustering method, e.g. agglomerative clustering or density-based clustering, using average or maximum linkage.

In addition, the disclosed system may associate each of the plurality of time-series data with a corresponding metadata set, to form a plurality of (metadata, time-series) data pairs. Each metadata set may be associated with an advertising campaign and include a set of attributes related to the targeting criteria set. The system can train a machine learning model to generate an embedding for each metadata set, such that each embedding corresponds to a respective metadata set and a time-series data paired with the respective metadata set. The embeddings may be generated as vectors to represent locations of metadata points in a high dimensional embedding space, where embeddings corresponding to similar time-series are co-located in the embedding space. For example, time-series 1 may be in a same cluster as time-series 2, but in a different cluster from time-series 3. In that case, embedding 2 corresponding to time-series 2 is placed closer to embedding 1 corresponding to time-series 1 in the embedding space, compared to embedding 3 corresponding to time-series 3. The machine learning model may be trained to minimize a contrastive loss function.

For a new metadata set of a cold advertising campaign with no historical time-series data, the trained machine learning model can be used to generate a new embedding. The system may search the embedding space to find K embeddings that are nearest neighbors to the new embedding in the embedding space. While the K embeddings correspond to K time-series data, the system may compute a weighted combination of the K time-series data to generate predicted advertising opportunity data for this cold advertising campaign.

In various embodiments, the predicted advertising opportunity data may be used to estimate: supply forecast representing a total forecasted supply present in an advertisement opportunity inventory for a particular time period, auction opportunity which indicates advertisement impressions buyers can buy through auction or competition, and/or winning impression which indicates an amount of impressions a buyer can win with a particular bid value in the environment of auction opportunity. The disclosed methods can increase coverage and reliability of advertising opportunity forecast. This will improve predictability of advertising performance, help advertisers in campaign planning, increase engagement of advertisers, and increase advertising revenue of the retailer.

Furthermore, in the following, various embodiments are described with respect to methods and systems for predicting advertising related inventory and opportunity for advertising campaigns based on metadata and dimensionality reduction are disclosed. In some embodiments, a disclosed method includes: receiving, from a computing device, a prediction request associated with an advertising campaign; determining a metadata set associated with the advertising campaign; generating, based on a machine learning model, an embedding for the metadata set; determining, based on the embedding, at least one embedding associated with at least one advertising opportunity data; generating predicted advertising opportunity data for the advertising campaign based on the at least one advertising opportunity data; and transmitting the predicted advertising opportunity data to the computing device.

Turning to the drawings, FIG. 1 is a network environment 100 configured to predict advertising opportunity for advertising campaigns, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a metadata-based advertising opportunity predictor 102 (e.g., a server, such as an application server), a web server 104, a cloud-based engine 121 including one or more processing devices 120, workstation(s) 106, a database 116, and one or more user computing devices 110, 112, 114 operatively coupled over the network 118. The metadata-based advertising opportunity predictor 102, the web server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the metadata-based advertising opportunity predictor 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the metadata-based advertising opportunity predictor 102.

In some examples, each of the multiple user computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites providing one or more products or services. In some examples, the metadata-based advertising opportunity predictor 102, the processing devices 120, and/or the web server 104 are operated by a retailer. The multiple user computing devices 110, 112, 114 may be operated by customers or advertisers associated with the retailer websites. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the metadata-based advertising opportunity predictor 102 over the communication network 118. The workstation(s) 106 may send data to, and receive data from, the metadata-based advertising opportunity predictor 102. For example, the workstation(s) 106 may transmit data identifying items purchased by a customer at the store 109 to the metadata-based advertising opportunity predictor 102.

Although FIG. 1 illustrates three user computing devices 110, 112, 114, the network environment 100 can include any number of user computing devices 110, 112, 114. Similarly, the network environment 100 can include any number of the metadata-based advertising opportunity predictors 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first user computing device 110, the second user computing device 112, and the Nth user computing device 114 may communicate with the web server 104 over the communication network 118. For example, each of the multiple computing devices 110, 112, 114 may be operable to view, access, and interact with a website, such as a retailer's website hosted by the web server 104. The web server 104 may transmit user session data related to a customer's activity (e.g., interactions) on the website.

In some examples, a customer may operate one of the user computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the metadata-based advertising opportunity predictor 102 over the communication network 118. The website may also allow the customer to add one or more of the items to an online shopping cart, and allow the customer to perform a "checkout" of the shopping cart to purchase the items. In some examples, the web server 104 transmits purchase data identifying items the customer has purchased from the website to the metadata-based advertising opportunity predictor 102.

In some examples, an advertiser or a sponsor of advertisement, e.g., an online seller, may operate one of the user computing devices 110, 112, 114 to initiate a web browser or a user interface that is associated with a website hosted by the web server 104. The advertiser may, via the web browser or the user interface, view item sets sold by the seller on the website, view and manage existing campaigns for some item sets sold by the seller, view items recommended by the retailer based on machine learning models to create new campaigns for upcoming events, and/or create a new campaign including an item set sold by the seller. The website may capture at least some of these activities as campaign data. The web server 104 may transmit the campaign data to the metadata-based advertising opportunity predictor 102 over the communication network 118, and/or store the campaign data to the database 116.

In some embodiments, the web server 104 may transmit a prediction request to the metadata-based advertising opportunity predictor 102, e.g. upon a selection of an advertiser to create or run an advertising campaign. The prediction request may be sent standalone or together with campaign related data of the website. In some examples, the prediction request may carry or indicate campaign data of a proposed campaign, e.g. a targeting criteria set and/or a metadata set associated with the campaign. In some examples, the prediction request may also carry or indicate whether there is historical campaign data or time-series data for the campaign.

In some examples, the metadata-based advertising opportunity predictor 102 may execute one or more models (e.g., algorithms), such as a machine learning model, deep learning model, statistical model, etc., to predict advertising opportunity for an advertising campaign. The metadata-based advertising opportunity predictor 102 may generate an embedding for the metadata set associated with the advertising campaign, based on a trained machine learning model; and search in an embedding space to find one or more embeddings closest to the generated embedding. Each of the found embeddings is pre-associated with a time-series data representing predicted advertising opportunity data for a similar campaign with similar targeting criteria set. As such, predicted advertising opportunity data for the advertising campaign can be generated based on a weighted combination of the time-series data corresponding to the found embeddings. The metadata-based advertising opportunity predictor 102 may then transmit the predicted advertising opportunity data to provide a forecast for the advertising campaign in a predetermined time period.

The metadata-based advertising opportunity predictor 102 is further operable to communicate with the database 116 over the communication network 118. For example, the metadata-based advertising opportunity predictor 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the metadata-based advertising opportunity predictor 102, in some examples, the database 116 can be a local storage device, such as a hard drive, a non-volatile memory, or a USB stick. The metadata-based advertising opportunity predictor 102 may store online purchase data received from the web server 104 in the database 116. The metadata-based advertising opportunity predictor 102 may receive in-store purchase data from different stores 109 and store them in the database 116. The metadata-based advertising opportunity predictor 102 may also receive from the web server 104 user session data identifying events associated with browsing sessions, and may store the user session data in the database 116. The metadata-based advertising opportunity predictor 102 may also determine advertising opportunity data for campaigns, and may store advertising opportunity data in the database 116.

In some embodiments, the web server 104 may transmit a model training request to the metadata-based advertising opportunity predictor 102, e.g. upon an event or holiday, an instruction from a manager, or upon a pre-configured periodic prediction job. Upon the model training request, the metadata-based advertising opportunity predictor 102 may retrieve, e.g. from the database 116, metadata associated with some campaigns. The metadata-based advertising opportunity predictor 102 can separate the retrieved campaigns into non-cold campaigns having historical advertising opportunity data, and cold campaigns having no historical advertising opportunity data. For each non-cold campaign, a time-series data representing predicted advertising opportunity data for the campaign can be determined based on its historical advertising opportunity data, and can be associated with a metadata set for the campaign to form a (metadata, time-series) data pair. The metadata-based advertising opportunity predictor 102 may cluster all time-series data together with their paired metadata into different clusters, based on a similarity measure for the time-series data. The generated clusters will be used as training data to train an embedding model to learn a mapping from metadata space to a high dimensional Euclidean space, where the model is trained to make embeddings corresponding to similar time series be co-located in the Euclidean space, e.g. by minimizing a contrastive loss. The generated embeddings can be used during inference stage of a new campaign or new targeting criteria set. An advertising campaign may change its targeting criteria when there is a change in advertising location, page type, etc. for the advertising campaign. The changed targeting criteria corresponds to a newly generated targeting query with no or sparse historical data. In addition, advertising frequently comes with new audience list having no historical data. Instead of relying on any historical data, the trained model can be used to infer embeddings based on metadata related to targeting queries and audience themselves. A metadata may include targeting values for a targeting criteria set of the advertising campaign as well as some derivatives from the targeting values.

For each retrieved cold campaign, the metadata-based advertising opportunity predictor 102 can infer an embedding for the metadata set associated with the cold campaign based on the trained model, and determine predicted advertising opportunity data for the cold campaign based on nearest neighbors of the inferred embedding in the Euclidean space. In some embodiments, the inferred embedding itself is also added into the Euclidean space, to be used to determine nearest neighbors for other new metadata of other new or cold campaigns. In some embodiments, the metadata-based advertising opportunity predictor 102 may perform model training automatically without any request from the web server 104.

In some examples, the metadata-based advertising opportunity predictor 102 generates training data for a plurality of models (e.g., machine learning models, deep learning models, statistical models, algorithms, etc.) in addition to the embedding model. The metadata-based advertising opportunity predictor 102 trains the models based on their corresponding training data, and stores the models in a database, such as in the database 116 (e.g., a cloud storage).

The models, when executed by the metadata-based advertising opportunity predictor 102, allow the metadata-based advertising opportunity predictor 102 to determine predicted advertising opportunity data for advertising campaigns. In some examples, the metadata-based advertising opportunity predictor 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the metadata-based advertising opportunity predictor 102 may generate predicted advertising opportunity data for advertising campaigns based on metadata associated with the advertising campaigns, without using any historical advertising opportunity data of the advertising campaigns.

Figure 2:
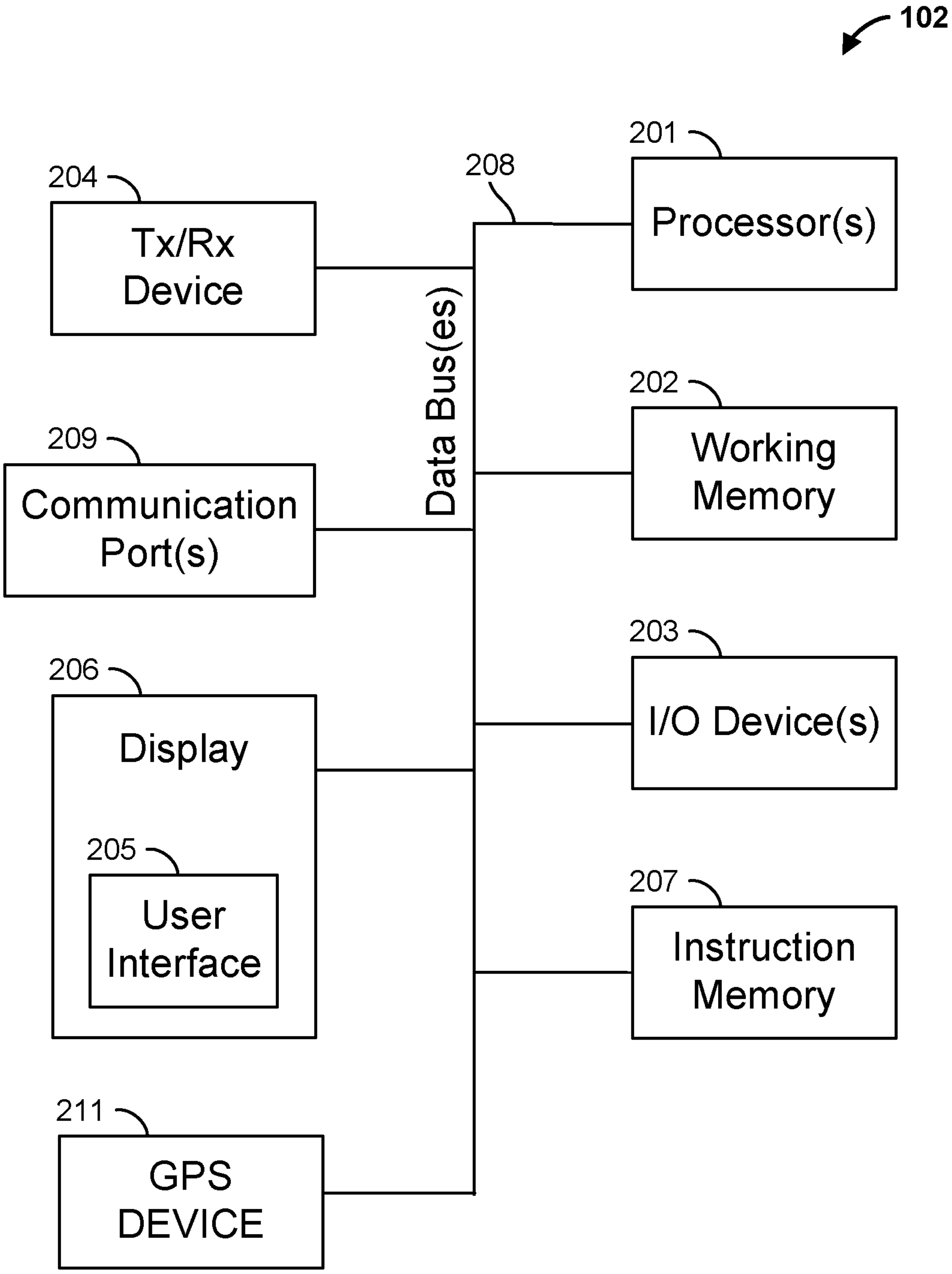
FIG. 2 is a block diagram of a metadata-based advertising opportunity predictor, in accordance with some embodiments of the present teaching.

FIG. 2 illustrates a block diagram of a metadata-based advertising opportunity predictor, e.g. the metadata-based advertising opportunity predictor 102 of FIG. 1, in accordance with some embodiments of the present teaching. In some embodiments, each of the metadata-based advertising opportunity predictor 102, the web server 104, the multiple user computing devices 110, 112, 114, and the one or more processing devices 120 in FIG. 1 may include the features shown in FIG. 2. Although FIG. 2 is described with respect to certain components shown therein, it will be appreciated that the elements of the metadata-based advertising opportunity predictor 102 can be combined, omitted, and/or replicated. In addition, it will be appreciated that additional elements other than those illustrated in FIG. 2 can be added to the metadata-based advertising opportunity predictor 102.

As shown in FIG. 2, the metadata-based advertising opportunity predictor 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the metadata-based advertising opportunity predictor 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the metadata-based advertising opportunity predictor 102 can include a single memory unit configured to operate as both instruction memory and working memory. Further, although embodiments are discussed herein including non-volatile memory, it will be appreciated that the metadata-based advertising opportunity predictor 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the metadata-based advertising opportunity predictor 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the metadata-based advertising opportunity predictor 102 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the metadata-based advertising opportunity predictor 102 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the metadata-based advertising opportunity predictor 102 and/or the web server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the metadata-based advertising opportunity predictor 102 may determine a local geographical area (e.g., town, city, state, etc.) of its position.

In some embodiments, the metadata-based advertising opportunity predictor 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
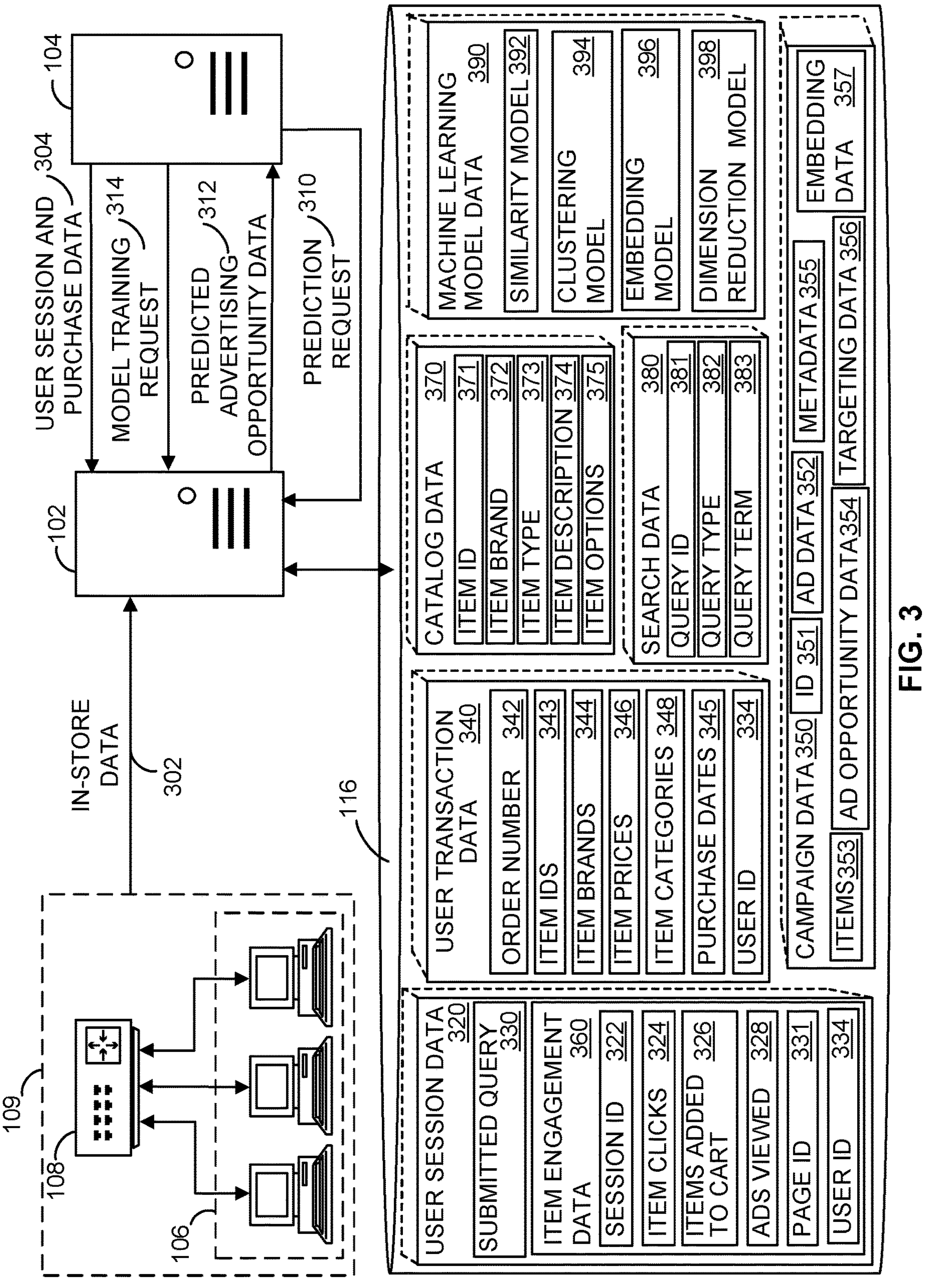
FIG. 3 is a block diagram illustrating various portions of a system for predicting advertising opportunity for advertising campaigns based on metadata, in accordance with some embodiments of the present teaching.

FIG. 3 is a block diagram illustrating various portions of a system for predicting advertising opportunity for advertising campaigns based on metadata, e.g. the system shown in the network environment 100 of FIG. 1, in accordance with some embodiments of the present teaching. As indicated in FIG. 3, the metadata-based advertising opportunity predictor 102 may receive user session and purchase data 304 from the web server 104. The user session and purchase data 304 may include user session data 320 identifying, for each user (e.g., customer), data related to that user's browsing session, such as when browsing a retailer's webpage hosted by the web server 104. The metadata-based advertising opportunity predictor 102 may store the user session data 320 into the database 116.

In some examples, the user session data 320 may include item engagement data 360 and/or submitted query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed and/or clicked during the browsing session, page ID 331 identifying a webpage (product page, search result page, home page, etc.) the user engaged with, and user ID 334 (e.g., a customer ID, retailer website login ID, a cookie ID, etc.). The submitted query data 330 may identify one or more searches conducted by a user during a browsing session (e.g., a current browsing session).

The user session and purchase data 304 may also identify and characterize one or more online purchases, such as purchases made by the user and other users via a retailer's website hosted by the web server 104. The metadata-based advertising opportunity predictor 102 may also receive in-store data 302 from the store 109, which identifies and characterizes one or more in-store purchases, in-store advertisements, in-store shopping data, etc. In some embodiments, the in-store data 302 may also indicate availability of items in the store 109, and/or user IDs that have selected the store 109 as a default store for picking up online orders.

The metadata-based advertising opportunity predictor 102 may parse the in-store data 302 and the user session and purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., a product type like grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store search data 380, which may identify one or more attributes of a plurality of queries submitted by users on the website hosted by the web server 104 and/or on a website of a search engine associated with the web server 104. The search data 380 may include, for each of the plurality of queries, a query ID 381 identifying a query previously submitted by users, a query type 382 (e.g., a head query, a torso query, or a tail query), and query term 383 identifying terms in a query.

In some embodiments, the database 116 may further store campaign data 350, which may identify data of one or more advertising campaigns proposed and/or created for the retailer's website hosted by the web server 104. The campaign data 350 may identify, for each campaign, campaign ID 351 identifying the campaign, advertisement data 352 identifying advertisements included in the campaign, campaign items 353 identifying items promoted by the campaign, advertising opportunity data 354 identifying historical and predicted advertising opportunities for campaigns, metadata 355 identifying meta information associated with each campaign, targeting data 356 identifying targeting criteria for each campaign, and embedding data 357 identifying embeddings mapped from campaign metadata. In some examples, metadata 355 may include a set of attributes associated with a campaign, e.g. advertising unit in a web page, advertising location in a web page, web page type, target audience, etc.

The database 116 may also store machine learning model data 390 identifying and characterizing one or more machine learning models and related data for predicting advertising opportunity based on metadata. For example, the machine learning model data 390 may include a similarity model 392, a clustering model 394, an embedding model 396, and a dimension reduction model 398.

In some embodiments, the similarity model 392 may be used to determine a similarity score between a pair of time-series data, each representing advertising opportunity data over a same time period for a respective campaign. The similarity model 392 may be trained based on one or more of the following metrics: correlation, L1 norm, L2 norm, dynamic time warping metric, etc. For example, the similarity model 392 may be used to generate a similarity matrix, each element of which is a similarity score for a corresponding pair of two time-series data. The similarity matrix includes all similarity scores for all possible pairs of time-series data being concerned.

The clustering model 394 may be used to group all time-series data being concerned into a plurality of clusters, based on the similarity matrix. Each time-series data represents advertising opportunity data for a campaign, and may be associated and paired with a metadata set for the campaign to form a data pair. As the time-series data are grouped into clusters, the data pairs are grouped into corresponding clusters as well. In some embodiments, the clustering model 394 may be trained or generated based on agglomerative clustering using average linkage or maximum linkage.

The embedding model 396 may be used to learn a mapping from metadata space to a high dimensional Euclidean space. The embedding model 396 may be a feed-forward neural network, e.g. a feed-forward Siamese neural network, trained based on labels to minimize a contrastive loss, which is a function of: distance between embeddings, indicator indicating whether two embeddings corresponding to a same cluster, and one or more trainable hyperparameters. The embedding model 396, after being trained, can generate embeddings such that similar time series in a same cluster will correspond to embeddings closely located in the Euclidean space.

Given a new metadata value, a trained embedding model 396 can be used to compute a new embedding for a new campaign, e.g. by forwardly passing the metadata value through a Siamese neural network. Based on the new embedding, similar time-series can be retrieved based on embeddings closest to the new embedding in the embedding space. The dimension reduction model 398 may be used to estimate a synthetic time-series data for the new campaign, e.g. based on a mean, a weighted mean or another combination of the similar time-series.

In some examples, the metadata-based advertising opportunity predictor 102 receives (e.g., in real-time) from the web server 104, a prediction request 310 seeking advertising opportunity information in a future time period for an advertising campaign. In response, the metadata-based advertising opportunity predictor 102 can determine a metadata set associated with the advertising campaign, generate an embedding for the metadata set based on the embedding model 396, and determine K embeddings that are nearest to the embedding and associated with K advertising opportunity data. Using the dimension reduction model 398, the metadata-based advertising opportunity predictor 102 can generate predicted advertising opportunity data 312 for the advertising campaign based on the K advertising opportunity data. The predicted advertising opportunity data 312 may be transmitted by the metadata-based advertising opportunity predictor 102 to the web server 104, to be shown to a corresponding seller proposing or creating the campaign.

In some examples, the metadata-based advertising opportunity predictor 102 receives from the web server 104, a model training request 314 for training one or more models for advertising opportunity forecast. In response, the metadata-based advertising opportunity predictor 102 can retrieve time-series data, e.g. the ad opportunity data 354, from the database 116 to generate training data based on the similarity model 392 and/or the clustering model 394. The training data may be used to train the embedding model 396 based on a Siamese neural network. In some embodiments, the metadata-based advertising opportunity predictor 102 itself may periodically train the models in the machine learning model data 390 without any request from the web server 104.

In some embodiments, the metadata-based advertising opportunity predictor 102 may assign one or more of the operations described above to a different processing unit or virtual machine hosted by the one or more processing devices 120. Further, the metadata-based advertising opportunity predictor 102 may obtain the outputs of the these assigned operations from the processing units, to train the machine learning models or generate the predicted advertising opportunity data 312 based on the outputs.

Figure 4:
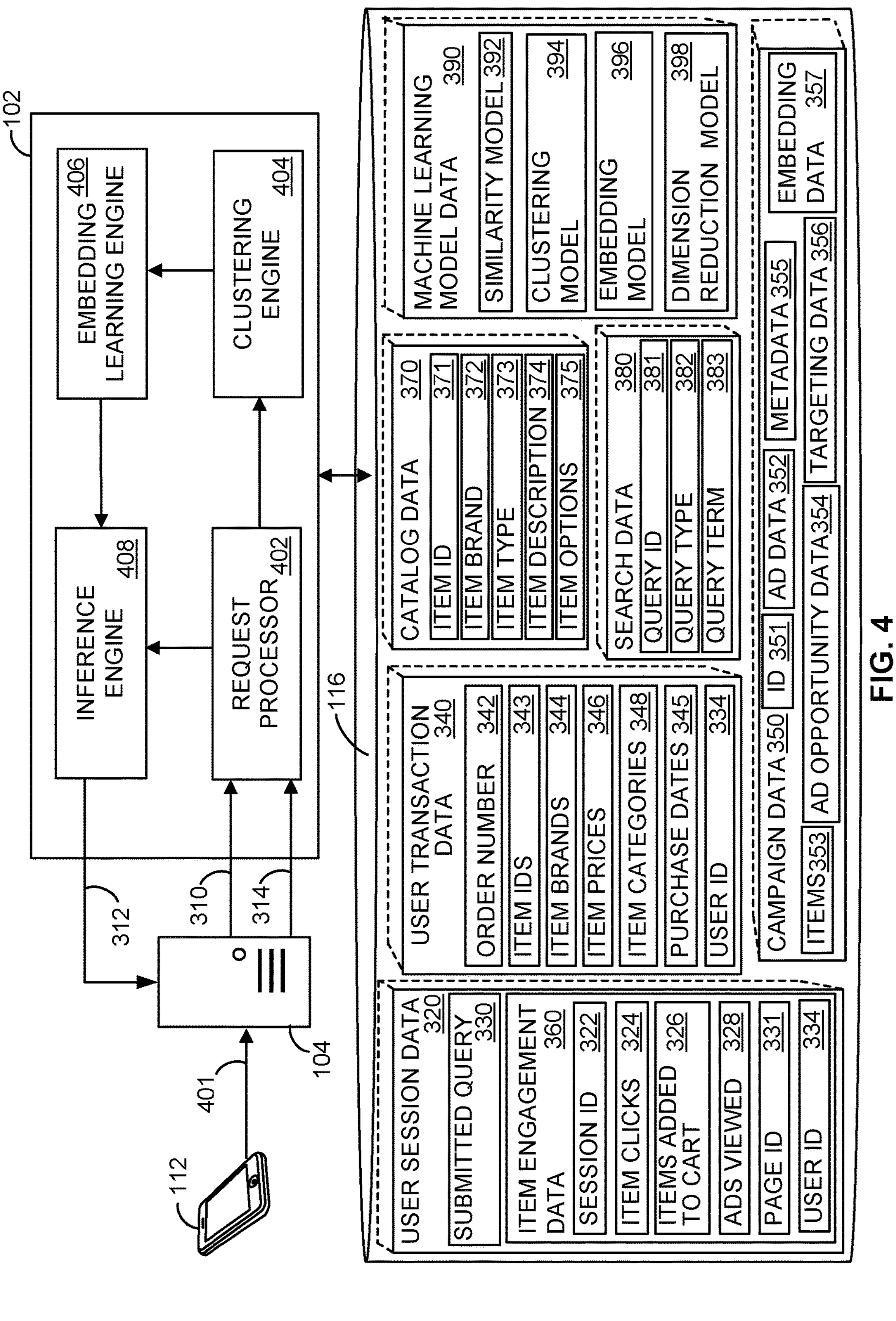
FIG. 4 is a block diagram illustrating various portions of a metadata-based advertising opportunity predictor, in accordance with some embodiments of the present teaching.

FIG. 4 is a block diagram illustrating various portions of a metadata-based advertising opportunity predictor, e.g. the metadata-based advertising opportunity predictor 102 in FIG. 1, in accordance with some embodiments of the present teaching. As shown in FIG. 4, the metadata-based advertising opportunity predictor 102 includes a request processor 402, a clustering engine 404, an embedding learning engine 406, and an inference engine 408. In some examples, one or more of the request processor 402, the clustering engine 404, the embedding learning engine 406, and the inference engine 408 are implemented in hardware. In some examples, one or more of the request processor 402, the clustering engine 404, the embedding learning engine 406, and the inference engine 408 are implemented as an executable program maintained in a tangible, non-transitory memory, such as instruction memory 207 of FIG. 2, which may be executed by one or processors, such as the processor 201 of FIG. 2.

In some examples, the request processor 402 may obtain from the web server 104 a prediction request 310 as a message 401 is sent from the user device 112 to the web server 104, e.g. as a seller creates an advertising campaign on a retailer's website via the user computing device 112, or as a seller selects an advertising campaign on the retailer's website via the user computing device 112 to request future advertising opportunity prediction. In some embodiments, the request processor 402 may obtain the prediction request 310 periodically, e.g. based on a pre-configuration. The request processor 402 may analyze the prediction request 310 to determine it is an inference request for a campaign, and retrieve campaign data related to the campaign. The request processor 402 may retrieve metadata 355 associated with the campaign, and send the retrieved metadata 355 to the inference engine 408 for time-series inference. In this case, an embedding model 396 has been trained and ready to use by the inference engine 408. The inference engine 408 may obtain the trained embedding model 396 either from the embedding learning engine 406 or from the database 116. As such, the inference engine 408 can compute an embedding for the retrieved metadata 355 based on the trained embedding model 396, determine K nearest embeddings to the embedding based on the embedding data 357, and infer the predicted advertising opportunity data 312 based on time-series data corresponding to the K nearest embeddings, e.g. using the dimension reduction model 398. The inference engine 408 may send the predicted advertising opportunity data 312 to the web server 104, and the web server 104 will show the predicted advertising opportunity data 312 to the seller via the user computing device 112. As such, the seller can plan advertising budget or make any business decision related to advertisement based on the predicted advertising opportunity data 312.

In some examples, the request processor 402 may obtain from the web server 104 a model training request 314 for training one or more models for advertising opportunity forecast. The model training request 314 may or may not be triggered by a user device. In some embodiments, the model training request 314 may be generated by the metadata-based advertising opportunity predictor 102 itself, e.g. periodically or based on an event, holiday or shopping season. The request processor 402 may analyze the model training request 314 to determine it is a training request, and retrieve campaign data for training. For example, the metadata-based advertising opportunity predictor 102 can retrieve the ad opportunity data 354 from the database 116, and separate the ad opportunity data 354 into: cold time-series data corresponding to cold campaigns without historical ad opportunity data, and non-cold time-series data corresponding to non-cold campaigns with historical ad opportunity data. For the non-cold time-series data, predicted time-series data representing predicted ad opportunity data in a future time period can be determined based on the corresponding historical ad opportunity data. The request processor 402 may either generate or retrieve the predicted time-series data for the non-cold campaigns and send the predicted time-series data to the clustering engine 404 for clustering.

In some embodiments, the clustering engine 404 can compute a similarity score representing a degree of similarity between each pair of the predicted time-series, e.g. based on the similarity model 392; and group all predicted time-series into clusters based on the similarity scores according to a clustering model. For example, when a similarity score for a pair of predicted time-series is higher than a predetermined threshold, the two predicted time-series will be grouped into a same cluster. In addition, since each predicted time-series is associated with a campaign, which has a metadata set, each predicted time-series can be paired with a corresponding metadata set. The clustering engine 404 may send the clustered predicted time-series together with their associated or paired metadata sets to the embedding learning engine 406 for training an embedding model, e.g. the embedding model 396.

The embedding learning engine 406 may use the clustered predicted time-series together with their associated or paired metadata sets as training data to train the embedding model 396 based on a neural network. In some embodiments, the embedding learning engine 406, rather than the clustering engine 404, can pair the clustered predicted time-series to the metadata sets to generate the training data. The embedding model 396 may be trained by the embedding learning engine 406 to minimize a loss function to generate embeddings for the metadata sets in an embedding space. While a metadata set can include many attributes in a very high dimension, the embedding generated for the metadata set can be reduced to a lower dimension vector. That is, an embedding is a dense representation of a metadata point in a representation space. In some embodiments, the dimensionality of the representation space or embedding space is independent of the complexity or dimensionality of the metadata sets. The embedding learning engine 406 can store the trained embedding model 396 in the database 116, and store the generated embedding data 357 in the database 116 as well.

In some embodiments, the inference engine 408 can generate new embeddings for the cold campaigns without historical ad opportunity data, based on the trained embedding model 396, and store the new embeddings into the embedding data 357. The inference engine 408 can also infer predicted time-series data for each cold campaign based on nearest neighbors of a corresponding new embedding, and store the predicted time-series data into the advertising opportunity data 354. As such, these new embeddings and predicted time-series data can be used later for advertising opportunity prediction for other new and cold campaigns.

In some embodiments, the future time period for advertising opportunity prediction may be next month, next year, or next two years. In some embodiments, the machine learning model(s) utilized by the metadata-based advertising opportunity predictor 102 may be trained every month, every year, or every two years.

Figure 5:
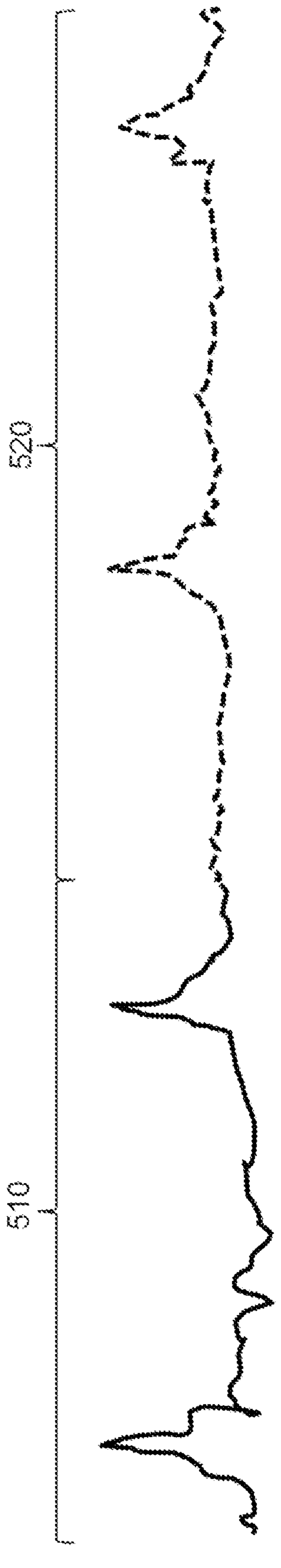
FIG. 5 illustrates a time series data representing historical and predicted advertising opportunity, in accordance with some embodiments of the present teaching.

FIG. 5 illustrates a time-series data 500 representing historical and predicted advertising opportunity of an advertising campaign, in accordance with some embodiments of the present teaching. As shown in FIG. 5, the time-series data 500 includes a historical time-series 510 representing advertising opportunity data in a past time period, and a predicted time-series 520 representing predicted advertising opportunity data in a future time period. Each data point on the time-series data 500 may represent a daily traffic from a target audience associated with the advertising campaign, thereby indicating a daily advertising opportunity for the advertising campaign and indicating a daily magnitude of advertising opportunity inventory for the target audience. While the predicted time-series 520 can be inferred based on the historical time-series 510, the disclosed system can infer the predicted time-series 520 based on metadata associated with advertising campaign, even when the historical time-series 510 is not available, which is the case for all new and cold campaigns.

Figure 6:
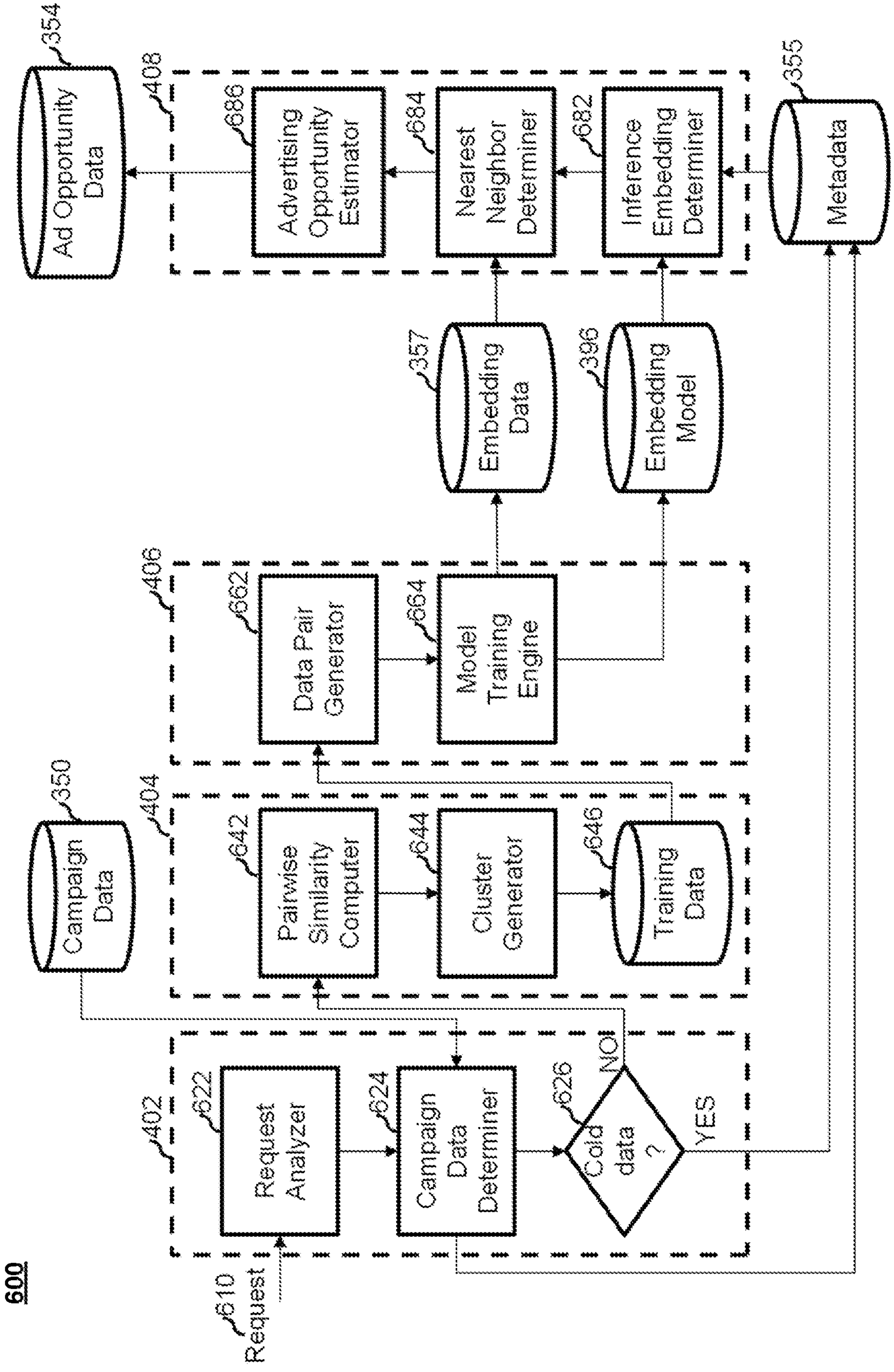
FIG. 6 illustrates an exemplary diagram showing detailed portions of a metadata-based advertising opportunity predictor, in accordance with some embodiments of the present teaching.

FIG. 6 illustrates an exemplary diagram 600 showing detailed portions of a metadata-based advertising opportunity predictor, e.g. the metadata-based advertising opportunity predictor 102 in FIG. 1 or FIG. 4, in accordance with some embodiments of the present teaching. As shown in FIG. 6, the request processor 402 in this example further includes: a request analyzer 622 and a campaign data determiner 624; the clustering engine 404 in this example further includes: a pairwise similarity computer 642 and a cluster generator 644; the embedding learning engine 406 in this example further includes: a data pair generator 662 and a model training engine 664; and the inference engine 408 in this example further includes: an inference embedding determiner 682, a nearest neighbor determiner 684 and an advertising opportunity estimator 686. In some examples, one or more of the request analyzer 622, the campaign data determiner 624, the pairwise similarity computer 642, the cluster generator 644, the data pair generator 662, the model training engine 664, the inference embedding determiner 682, the nearest neighbor determiner 684 and the advertising opportunity estimator 686 are implemented in hardware. In some examples, one or more of the request analyzer 622, the campaign data determiner 624, the pairwise similarity computer 642, the cluster generator 644, the data pair generator 662, the model training engine 664, the inference embedding determiner 682, the nearest neighbor determiner 684 and the advertising opportunity estimator 686 are implemented as an executable program maintained in a tangible, non-transitory memory, such as instruction memory 207 of FIG. 2, which may be executed by one or processors, such as the processor 201 of FIG. 2.

In some examples, the request analyzer 622 in the request processor 402 may obtain a request 610, which may be either a prediction request or a model training request. The request analyzer 622 can analyze the request 610 to determine the request type and send the analyzed request information to the campaign data determiner 624.

The campaign data determiner 624 in the request processor 402 may generate or retrieve campaign data from the campaign data 350 based on the request type. For a prediction request seeking predicted advertising opportunity data for a new advertising campaign, the campaign data determiner 624 may retrieve targeting data 356 in the campaign data 350 for the advertising campaign, generate a new metadata for the advertising campaign based on the targeting data 356, and store the new metadata as part of the metadata 355. In some embodiments, the targeting data 356 includes a targeting criteria set associated with the advertising campaign; and the targeting criteria set may include at least one criterion related to at least one of the following attributes of the advertising campaign: advertising unit in a web page, advertising location in a web page, web page type (e.g. home page, search result page, product page, check out page, etc.), or target audience. A metadata set for the advertising campaign may be determined based on the targeting criteria set.

For a model training request for training one or more models for predicting advertising opportunity, the campaign data determiner 624 may retrieve existing campaign IDs 351 each with corresponding ad opportunity data 354 in the campaign data 350, and separate the retrieved data into cold data and non-cold data. The campaign data determiner 624 may send each retrieved campaign data to different modules based on an operation 626, where it is determined whether the retrieved data is cold data or not. If the retrieved data is cold data for a cold campaign, which means there is no historical ad opportunity data 354 for the retrieved campaign ID, the campaign data determiner 624 may retrieve or generate metadata for the retrieved campaign ID and store the generated metadata as part of the metadata 355. If the retrieved data is not cold data for a non-cold campaign, which means there is historical ad opportunity data 354 for the retrieved campaign ID, the campaign data determiner 624 may retrieve or generate predicted time-series data representing predicted ad opportunity data for the retrieved campaign ID, e.g. based on its historical ad opportunity data 354, and send the predicted time-series data for the retrieved campaign ID to the pairwise similarity computer 642. In addition, the campaign data determiner 624 may retrieve, from the campaign data 350, a metadata set corresponding to each retrieved non-cold campaign, and send the metadata set to the pairwise similarity computer 642 as well.

The pairwise similarity computer 642 in the clustering engine 404 may obtain a plurality of metadata sets, each maybe determined based on a respective targeting criteria set; and obtain a plurality of time-series data, each maybe representing predicted advertising opportunity data for a respective targeting criteria set. In some embodiments, the plurality of metadata sets are denoted by M1, M2, M3 and so on, where each metadata set is a set of numerical or categorical attributes, e.g. ad_unit, ad_location, page_type, etc. In some embodiments, the plurality of time-series data are univariate time series data denoted by TS1, TS2 and so on. Because both time series data and metadata sets are associated with targeting queries for advertising campaigns, the pairwise similarity computer 642 can associate the plurality of metadata sets with the plurality of time series data to form a plurality of data pairs corresponding to different targeting queries for different advertising campaigns, where each data pair being formed by a respective metadata set and a respective time series data. In some embodiments, the association may be performed later by the data pair generator 662.

The pairwise similarity computer 642 may compute, for every two data pairs of the plurality of data pairs, a similarity score indicating a degree of similarity between two time series data in the two data pairs, to generate a plurality of similarity scores. For example, the cluster generator 644 can obtain data pairs (Mi, TSi) including metadata and associated time series data, and retrieve all time series data. In some examples, when the pairwise similarity computer 642 does not perform association between the time series data and the metadata, the pairwise similarity computer 642 may directly compute similarity scores for the time series data TS1, TS2 . . . . For example, the pairwise similarity computer 642 may compute a pairwise similarity Sim(i, j) for all time-series pairs (TSi, TSj). In some embodiments, Sim(i,j) may be computed based on one or more of the following metrics: correlation, L1 norm, L2 norm, dynamic time warping metric, etc. to indicate a similarity between patterns of different time series data. If or when the time series data and the metadata are paired, the Sim(i,j) is also a similarity measure between data pairs (M_i, TS_i) and (M_j, TS_j). In some embodiments, the pairwise similarity computer 642 may generate a similarity matrix, each element of which is a pairwise similarity Sim(i,j) for a corresponding time-series pair.

The cluster generator 644 in the clustering engine 404 may generate a plurality of clusters by clustering the plurality of data pairs based on the plurality of similarity scores. In some examples, when the pairwise similarity computer 642 does not perform association between the time series data and the metadata, the cluster generator 644 may generate the clusters by clustering the time series data. Each cluster is a group of time-series (maybe associated metadata) which are similar to each other as measured by a similarity measure, e.g. the Sim(i,j) as computed by the pairwise similarity computer 642. In some embodiments, the time series data may be grouped based on the similarity matrix to generate the cluster, e.g. by an agglomerative clustering using average linkage or maximum linkage.

In some embodiments, the cluster generator 644 may first generate, based on each data pair, a cluster including the data pair as a single cluster member; and then iteratively merging every possible two clusters when a maximum distance between cluster members of the two clusters is less than a predetermined threshold, to generate the plurality of clusters. Following agglomerative clustering, the cluster generator 644 may first treat every node (a time-series data or a data pair) as an independent cluster. In successive iterations, clusters are merged if some merging criteria is satisfied. In some examples, a maximum linkage merging criteria may be satisfied to merge two clusters, when a maximum distance between cluster members of the two cluster is less than a predefined threshold, which may be a tunable parameter threshold-distance. In some examples, an average linkage merging criteria may be satisfied to merge two clusters, when an average distance between cluster members of the two cluster is less than a predefined threshold, which may be a tunable parameter threshold-distance.

The cluster generator 644 may generate training data 646 based on the plurality of clusters. In some embodiments, the clustered time series with the metadata will be used as ground truth to train a representation learning neural network at the embedding learning engine 406. As discussed above, the pairwise similarity computer 642 and the cluster generator 644 may operate regarding time-series data or regarding data pairs including the time-series data. In various embodiments, the training data 646 may be stored locally in the clustering engine 404, or stored in the database 116.

The data pair generator 662 in the embedding learning engine 406 may obtain the training data 646 for training an embedding model, e.g. the embedding model 396. As discussed above, the pairwise similarity computer 642 and the cluster generator 644 may not perform association between the time series data and the metadata. In this case, the data pair generator 662 may associate the time series data with the metadata to generate data pairs (M1, TS1), (M2, TS2), etc. The output from the cluster generator 644 includes a set of clusters {Ci}, i=1, 2 . . . n, assuming there are n clusters. After association between the time series data and the metadata, the i-th cluster Ci would contain similar time-series data in form of data pairs [(Mi1, TSi1), (Mi2, TSi2) . . . (Mim, TSim)], assuming the i-th cluster Ci has m cluster members or nodes.

The model training engine 664 in the embedding learning engine 406 may train a machine learning model, e.g. the embedding model 396, based on the training data 646 to generate a mapping from each metadata set in the plurality of clusters to a respective embedding in an embedding space. In some embodiments, the model training engine 664 is to learn a mapping from the metadata space to K dimensional Euclidean space R^k using a feed-forward network, e.g. a feed-forward Siamese neural network, where K may be any positive integer.

In some embodiments, for every two data pairs of the plurality of data pairs, the model training engine 664 can compute a distance between two embeddings of the two metadata sets of the two data pairs in the embedding space; generate an indicator or label based on the two data pairs, where the indicator being equal to one when the two data pairs belong to a same cluster and being equal to zero when the two data pairs belong to different clusters; determine a margin, where the margin is a hyperparameter indicating a minimum distance between the two embeddings when the two data pairs belong to different clusters; and compute a contrastive loss function based on: the distance, the indicator, and the margin. The embedding model 396 may be a Siamese neural network trained to learn at least one hyperparameter to minimize a loss function of the contrastive loss functions computed for all possible two data pairs of the plurality of data pairs. By minimizing the loss function, the trained Siamese neural network can generate embeddings, such that embeddings corresponding to similar time series are co-located in the embedding space. These embeddings may be stored as the embedding data 357 to be used for inferring time-series data. The trained embedding model 396 can be used to compute embeddings for new metadata values.

Figure 7:
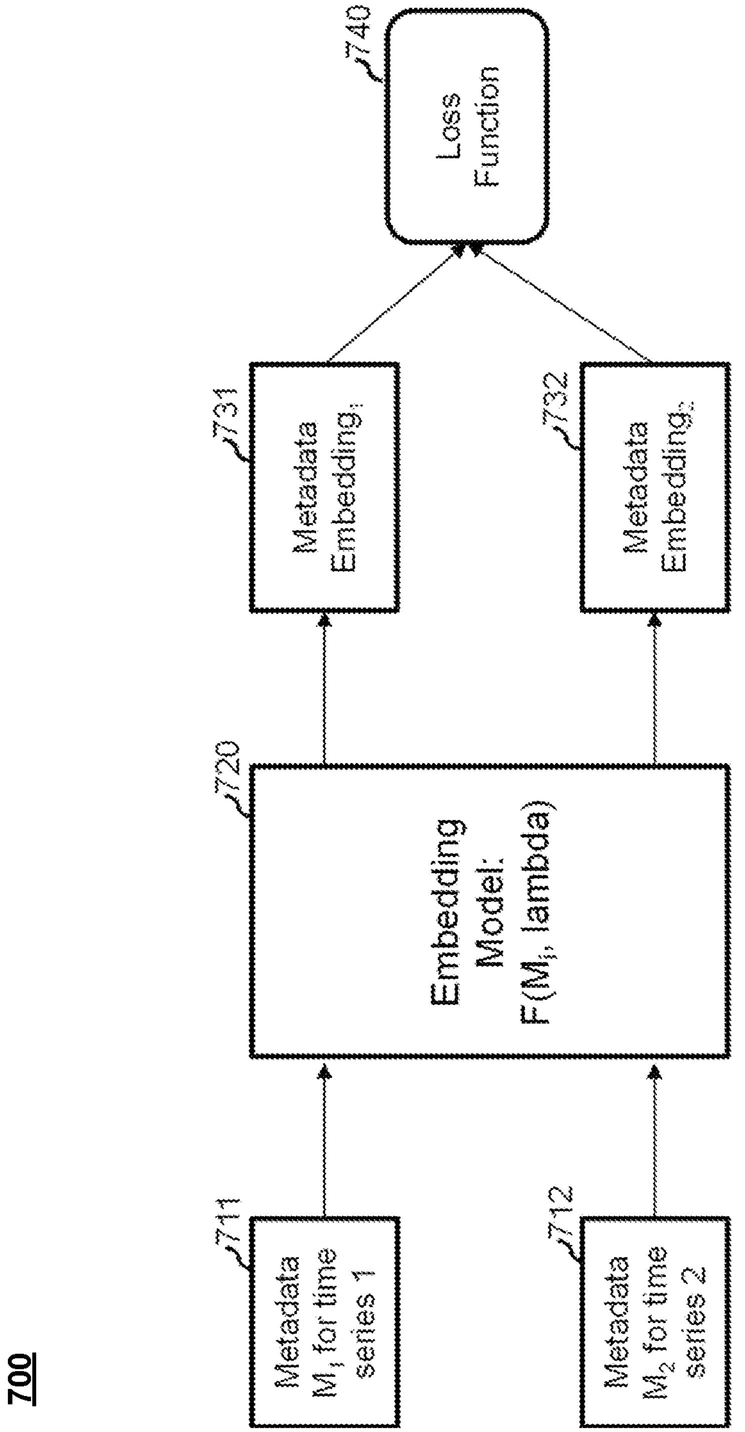
FIG. 7 illustrates an exemplary process of computing a contrastive loss for training an embedding model, in accordance with some embodiments of the present teaching.

FIG. 7 illustrates an exemplary process 700 of computing a contrastive loss for training an embedding model, in accordance with some embodiments of the present teaching.

As shown in FIG. 7, the process 700 starts with inputting both metadata $M_1$ 711 for time-series 1 and metadata $M_2$ 712 for time-series 2 to a same embedding model 720.

In this example, assuming the embedding model 720 is a feed-forward Siamese neural network denoted by F($M_i$, lambda), where lambda represents a set of hyperparameters, the embedding model 720 can parallelly or independently generate two outputs, i.e. two metadata embeddings 731, 732, respectively based on the two inputs 711, 712. Following the feed-forward Siamese neural network F, the two metadata embeddings 731, 732 can be computed respectively based on equations (1) and (2):

$$\text{Embedding}_1 = F(M_1, \text{lambda}) \quad (1)$$

$$\text{Embedding}_2 = F(M_2, \text{lambda}) \quad (2)$$

In some embodiments, the function F may represent a multilayer perceptron neural network. During training, the system may generate an indicator or label Y; where Y=1, if $M_1$ and $M_2$ correspond to time-series data belonging to a same cluster, and Y=0, if $M_1$ and $M_2$ correspond to time-series data belonging to two different clusters. In addition, the system can compute a distance between $M_1$ and $M_2$, based on:

$$D = \text{Euclidean\_distance}(M_1, M_2) \quad (3)$$

Then, a loss function 740 can be computed based on the metadata embeddings 731, 732. In some embodiments, the loss function 740 represents a contrastive loss computed as:

$$\text{Contrastive Loss} = Y \times D^2 + (1-Y) \times \{\max(0, m-D)\}^2 \quad (4)$$

As such, if two time-series belong to different clusters, then the two time-series are separated at least by a margin m in embedding space.

Referring back to FIG. 6, the model training engine 664 may train the embedding model 396 by minimizing the contrastive loss function to find the optimal hyperparameter set lambda and the model F. When the embedding model 396 is trained or re-trained with a different set of time series, the learned lambda may be different as well. For a new metadata value, the inference engine 408 can infer its associated time-series based on the trained embedding model 396 and the embedding data 357.

In some embodiments, a metadata set can be determined based on a targeting criteria set that is not associated with any historical advertising opportunity data. The inference embedding determiner 682 in the inference engine 408 may compute a new embedding ($\text{Embedding}_{New}$) for a new metadata ($M_{New}$) based on the trained embedding model 396. For example, the new embedding may be computed by passing the new metadata through a trained feed forward Siamese network, based on:

$$\text{Embedding}_{New} = F(M_{New}, \text{lambda}) \quad (5)$$

The nearest neighbor determiner 684 in the inference engine 408 may determine K embeddings that are closest to the new embedding among all embeddings in the embedding space, e.g. based on the embedding data 357, where K is a positive integer. In some embodiments, the nearest neighbor determiner 684 can also determine K metadata sets each corresponding to a respective one of the K embeddings; and determine K data pairs each including a respective one of the K metadata sets and a respective one of K time series data. That is, the nearest neighbor determiner 684 may generate a similar cluster set which includes K time series data corresponding to the K nearest embeddings, based on:

$$\text{Similar\_Cluster\_}Set = K\text{\_Nearest\_Neighbor}(\text{Embedding}_{New}) \quad (6)$$

In some embodiments, the K time series can be retrieved from an indexed set quickly by doing a nearest-neighbor search in the embedding space. For example, the system can build up an index set for approximate nearest neighbors (ANN) of each given embedding (Embedding_i) corresponding to a data pair (M_i, TS_i). This can help to perform a real-time inference for a new embedding. For example, the system can retrieve K approximately nearest neighbors based on the ANN index. In some embodiments, the system can divide the embedding space into several buckets or contiguous sub-spaces, determine a sub-space the new embedding belongs to, and perform a quick search in the determined sub-space to find the K approximately nearest neighbors, to get a good tradeoff between performance and efficiency.

The advertising opportunity estimator 686 in the inference engine 408 may compute a weighted combination of the K time series data in the similar cluster set; and generate the predicted advertising opportunity data for the advertising campaign having the new metadata value, based on the weighted combination. The weighted combination may use weights based on distances between each of the K neighbor embeddings to the new embedding, such that a time series data corresponding to a closer embedding will be assigned a larger weight. For example, the advertising opportunity estimator 686 may estimate the predicted time series by applying a dimension reduction model 398, which may be mean or weighted mean, on the retrieved time series in the similar cluster set, e.g. based on:

$$\text{Predicted\_Time\_Series} = \text{Weighted\_Mean}(\text{TS's in Similar\_Cluster\_Set}) \quad (7)$$

As such, a synthetic time-series data representing predicted advertising opportunity data for an advertising campaign can be generated without using historical or temporal time-series data. The advertising opportunity estimator 686 can store the predicted time series data into the database 116 as the advertising opportunity data 354, which may be used for future model training and/or future inference of advertising opportunity for other new and cold campaigns.

Figure 8:
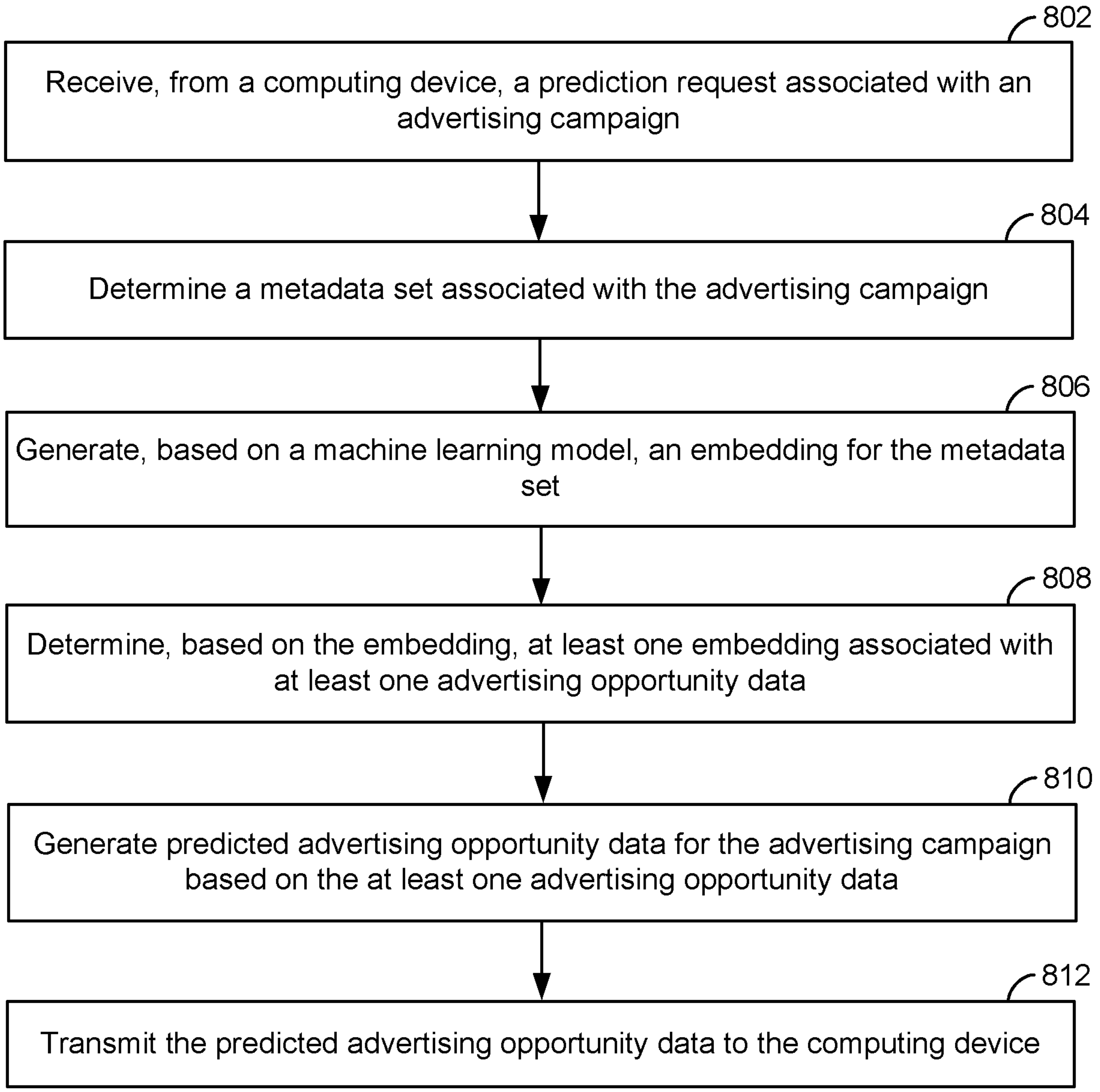
FIG. 8 is a flowchart illustrating an exemplary method for recommending items to create advertising campaigns for upcoming events, in accordance with some embodiments of the present teaching.

FIG. 8 is a flowchart illustrating an exemplary method 800 for recommending items to create advertising campaigns for upcoming events, in accordance with some embodiments of the present teaching. In some embodiments, the method 800 can be carried out by one or more computing devices, such as the metadata-based advertising opportunity predictor 102 and/or the cloud-based engine 121 of FIG. 1. Beginning at operation 802, a prediction request associated with an advertising campaign is received from a computing device. At operation 804, a metadata set associated with the advertising campaign is determined. At operation 806, an embedding for the metadata set is generated based on a machine learning model. Based on the embedding, at least one embedding associated with at least one advertising opportunity data is determined at operation 808. Predicted advertising opportunity data is generated at operation 810 for the advertising campaign based on the at least one advertising opportunity data. The predicted advertising opportunity data is transmitted at operation 812 to the computing device.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system for training a machine learning model, comprising:
- a non-transitory memory having instructions stored thereon; and
- at least one processor operatively coupled to the non-transitory memory, and configured to read the instructions to:
  - associate a plurality of metadata sets with a plurality of time series data to form a plurality of data pairs,
  - for every two data pairs of the plurality of data pairs, compute a contrastive loss function based on: a distance between two metadata sets of the two data pairs, an indicator indicating whether the two data pairs belong to a same cluster, and a minimum distance between the two metadata sets when the two data pairs belong to different clusters,
  - compute, for every two data pairs of the plurality of data pairs, a similarity score indicating a degree of similarity between two time series data in the two data pairs, to generate a plurality of similarity scores,
  - generate, based on each data pair, a cluster including the data pair as a single cluster member;
  - iteratively merge every two clusters when a maximum distance between cluster members of the two clusters is less than a predetermined threshold, to generate a plurality of clusters based on the plurality of similarity scores;
  - generate training data based on the plurality of clusters;
  - train a machine learning model using the training data to learn at least one hyperparameter to minimize a combined loss function of contrastive loss functions computed for all possible two data pairs of the plurality of data pairs;
  - execute the trained machine learning model on a metadata set to generate an embedding for data prediction;
  - generate new training data based on a plurality of new time series data and a result of the data prediction;
  - re-train the machine learning model to update the at least one hyperparameter using the new training data to minimize the combined loss function of the contrastive loss functions computed for all possible two data pairs generated from the new training data; and
  - store the at least one hyperparameter in a database.

2. The system of claim 1, wherein:
- the metadata set is determined based on a targeting criteria set associated with an advertising campaign; and
- the targeting criteria set includes at least one criterion related to at least one of the following attributes of the advertising campaign: advertising unit in a web page, advertising location in a web page, web page type, or target audience.

3. The system of claim 1, wherein the at least one processor is configured to read the instructions to:
- obtain the plurality of metadata sets, each determined based on a respective targeting criteria set;
- obtain the plurality of time series data, each representing predicted advertising opportunity data for a respective targeting criteria set; and
- associate the plurality of metadata sets with the plurality of time series data to form the plurality of data pairs, wherein each data pair is formed by a respective metadata set and a respective time series data.

4. The system of claim 1, wherein the at least one processor is configured to read the instructions to:
- receive, from a computing device, a prediction request associated with an advertising campaign; and
- determine the metadata set associated with the advertising campaign.

5. The system of claim 4, wherein the at least one processor is configured to read the instructions to:
- determine, based on the embedding, at least one embedding associated with at least one advertising opportunity data;
- generate predicted advertising opportunity data for the advertising campaign based on the at least one advertising opportunity data; and
- transmit the predicted advertising opportunity data to the computing device.

6. The system of claim 5, wherein the at least one processor is configured to read the instructions to:
- train the machine learning model based on the training data to generate a mapping from each metadata set in the plurality of clusters to a respective embedding in an embedding space; and for every two data pairs of the plurality of data pairs, compute the distance between two embeddings of the two metadata sets of the two data pairs in the embedding space, generate the indicator based on the two data pairs, wherein the indicator is equal to one when the two data pairs belong to a same cluster and is equal to zero when the two data pairs belong to different clusters, determine a margin, wherein the margin indicates the minimum distance between the two embeddings when the two data pairs belong to different clusters, and compute the contrastive loss function based on: the distance, the indicator, and the margin.

7. The system of claim 6, wherein:

the machine learning model is a Siamese neural network; and the Siamese neural network is trained to learn the at least one hyperparameter to minimize the combined loss function of the contrastive loss functions computed for all possible two data pairs of the plurality of data pairs.

8. The system of claim 6, wherein:

the at least one embedding includes K embeddings that are closest to the embedding among all embeddings in the embedding space; and K is a positive integer.

9. The system of claim 8, wherein the predicted advertising opportunity data is generated based on:

determining K metadata sets each corresponding to a respective one of the K embeddings;

determining K data pairs each including a respective one of the K metadata sets and a respective one of K time series data;

computing a weighted combination of the K time series data; and generating the predicted advertising opportunity data for the advertising campaign based on the weighted combination.

10. The system of claim 1, wherein:

the metadata set is determined based on a targeting criteria set that is not associated with any historical advertising opportunity data.

11. A computer-implemented method, comprising:

associating a plurality of metadata sets with a plurality of time series data to form a plurality of data pairs;

for every two data pairs of the plurality of data pairs, computing a contrastive loss function based on: a distance between two metadata sets of the two data pairs, an indicator indicating whether the two data pairs belong to a same cluster, and a minimum distance between the two metadata sets when the two data pairs belong to different clusters;

computing, for every two data pairs of the plurality of data pairs, a similarity score indicating a degree of similarity between two time series data in the two data pairs, to generate a plurality of similarity scores;

generating, based on each data pair, a cluster including the data pair as a single cluster member;

iteratively merging every two clusters when a maximum distance between cluster members of the two clusters is less than a predetermined threshold, to generate a plurality of clusters based on the plurality of similarity scores;

generating training data based on the plurality of clusters;

training a machine learning model using the training data to learn at least one hyperparameter to minimize a combined loss function of contrastive loss functions computed for all possible two data pairs of the plurality of data pairs;

executing the trained machine learning model on a metadata set to generate an embedding for data prediction;

generating new training data based on a plurality of new time series data and a result of the data prediction;

re-training the machine learning model to update the at least one hyperparameter using the new training data to minimize the combined loss function of the contrastive loss functions computed for all possible two data pairs generated from the new training data; and storing the at least one hyperparameter in a database.

12. The computer-implemented method of claim 11, wherein:

the metadata set is determined based on a targeting criteria set associated with an advertising campaign;

the targeting criteria set and the advertising campaign are not associated with any historical advertising opportunity data; and the targeting criteria set includes at least one criterion related to at least one of the following attributes of the advertising campaign: advertising unit in a web page, advertising location in a web page, web page type, or target audience.

13. The computer-implemented method of claim 11, further comprising:

obtaining the plurality of metadata sets, each determined based on a respective targeting criteria set;

obtaining the plurality of time series data, each representing predicted advertising opportunity data for a respective targeting criteria set; and associating the plurality of metadata sets with the plurality of time series data to form the plurality of data pairs, wherein each data pair is formed by a respective metadata set and a respective time series data.

14. The computer-implemented method of claim 11, further comprising:

receiving, from a computing device, a prediction request associated with an advertising campaign; and determining the metadata set associated with the advertising campaign.

15. The computer-implemented method of claim 14, further comprising:

determining, based on the embedding, at least one embedding associated with at least one advertising opportunity data;

generating predicted advertising opportunity data for the advertising campaign based on the at least one advertising opportunity data; and transmitting the predicted advertising opportunity data to the computing device.

16. The computer-implemented method of claim 15, further comprising:

training the machine learning model based on the training data to generate a mapping from each metadata set in the plurality of clusters to a respective embedding in an embedding space; and for every two data pairs of the plurality of data pairs, computing the distance between two embeddings of the two metadata sets of the two data pairs in the embedding space, generating the indicator based on the two data pairs, wherein the indicator is equal to one when the two data pairs belong to a same cluster and is equal to zero when the two data pairs belong to different clusters, determining a margin, wherein the margin indicates the minimum distance between the two embeddings when the two data pairs belong to different clusters, and computing the contrastive loss function based on: the distance, the indicator, and the margin.

17. The computer-implemented method of claim 16, wherein:

the machine learning model is a Siamese neural network; and the Siamese neural network is trained to learn at least one hyperparameter to minimize the combined loss function of the contrastive loss functions computed for all possible two data pairs of the plurality of data pairs.

18. The computer-implemented method of claim 16, wherein:

the at least one embedding includes K embeddings that are closest to the embedding among all embeddings in the embedding space; and K is a positive integer.

19. The computer-implemented method of claim 18, wherein generating the predicted advertising opportunity data comprises:

determining K metadata sets each corresponding to a respective one of the K embeddings;

determining K data pairs each including a respective one of the K metadata sets and a respective one of K time series data;

computing a weighted combination of the K time series data; and generating the predicted advertising opportunity data for the advertising campaign based on the weighted combination.

20. A non-transitory computer readable medium having instructions stored thereon, wherein the instructions, when executed by at least one processor, cause at least one device to:

associate a plurality of metadata sets with a plurality of time series data to form a plurality of data pairs;

for every two data pairs of the plurality of data pairs, compute a contrastive loss function based on: a distance between two metadata sets of the two data pairs, an indicator indicating whether the two data pairs belong to a same cluster, and a minimum distance between the two metadata sets when the two data pairs belong to different clusters;

compute, for every two data pairs of the plurality of data pairs, a similarity score indicating a degree of similarity between two time series data in the two data pairs, to generate a plurality of similarity scores;

generate, based on each data pair, a cluster including the data pair as a single cluster member;

iteratively merge every two clusters when a maximum distance between cluster members of the two clusters is less than a predetermined threshold, to generate a plurality of clusters based on the plurality of similarity scores;

generate training data based on the plurality of clusters;

training a machine learning model using the training data to learn at least one hyperparameter to minimize a combined loss function of contrastive loss functions computed for all possible two data pairs of the plurality of data pairs;

execute the trained machine learning model on a metadata set to generate an embedding for data prediction;

generate new training data based on a plurality of new time series data and a result of the data prediction;

re-train the machine learning model to update the at least one hyperparameter using the new training data o minimize the combined loss function of the contrastive loss functions computed for all possible two data pairs generated from the new training data; and store the at least one hyperparameter in a database.

* * * * *